(12) United States Patent
Hosie et al.

(10) Patent No.: US 8,763,012 B2
(45) Date of Patent: *Jun. 24, 2014

(54) SCALABLE, PARALLEL PROCESSING OF MESSAGES WHILE ENFORCING CUSTOM SEQUENCING CRITERIA

(75) Inventors: John Hosie, Eastleigh (GB); John A. Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,583

(22) Filed: Mar. 4, 2012

(65) Prior Publication Data
US 2013/0081063 A1 Mar. 28, 2013

Related U.S. Application Data

(63) Continuation of application No. 13/244,079, filed on Sep. 23, 2011.

(51) Int. Cl.
*G06F 3/00* (2006.01)
*G06F 15/16* (2006.01)

(52) U.S. Cl.
USPC ............ 719/314; 719/313; 709/206; 709/207

(58) Field of Classification Search
None
See application file for complete search history.

(56) References Cited

U.S. PATENT DOCUMENTS

| | | | |
|---|---|---|---|
| 7,039,914 B2 | 5/2006 | Potter, Jr. | |
| 7,240,097 B2 | 7/2007 | Holdsworth et al. | |
| 7,788,674 B1* | 8/2010 | Siegenfeld | 719/313 |
| 2003/0110230 A1* | 6/2003 | Holdsworth et al. | 709/207 |
| 2003/0158883 A1 | 8/2003 | Drudis et al. | |
| 2007/0118601 A1* | 5/2007 | Pacheco | 709/206 |
| 2008/0091712 A1 | 4/2008 | Daherkar et al. | |
| 2008/0148275 A1 | 6/2008 | Krits et al. | |
| 2008/0181245 A1 | 7/2008 | Basso et al. | |
| 2008/0263564 A1 | 10/2008 | Gambino | |
| 2009/0063360 A1* | 3/2009 | Callaway et al. | 705/36 R |
| 2009/0257450 A1 | 10/2009 | Sirigiri et al. | |
| 2010/0179994 A1 | 7/2010 | Bittles et al. | |
| 2010/0251262 A1* | 9/2010 | Rokicki et al. | 719/314 |
| 2010/0281491 A1* | 11/2010 | Surlaker et al. | 719/314 |
| 2013/0081062 A1 | 3/2013 | Hosie et al. | |

FOREIGN PATENT DOCUMENTS

EP 0932101 A2 7/1999

OTHER PUBLICATIONS

"FastForward for Efficient Pipeline Parallelism—A Cache-Optimized Concurrent Lock-Free Queue", John Giacomoni, 2008, pp. 1-10.*
"The Linux Programming Interface", Kerrisk, 2010, pp. 1-27.*
PCT Application PCT/EP2012/067171, International Search Report and Written Opinion dated Feb. 11, 2013 (11 pages).

(Continued)

*Primary Examiner* — Tuan Dao
(74) *Attorney, Agent, or Firm* — Marcia L. Doubet

(57) ABSTRACT

Scalable, parallel (i.e., concurrent) processing of messages is provided from a message queue, while at the same time enforcing sequencing within a stream. Dependencies among messages can therefore be respected. The criteria for determining which messages form a stream are not required to be known to the message dispatcher, which receives a stream name and determines whether another message in that named stream is already being processed. If so, the dispatcher determines whether the invoker should wait temporarily, or should be given a different message that was previously blocked and has now become available for processing, or should be instructed to retrieve a different message from the message queue.

5 Claims, 6 Drawing Sheets

(56) References Cited

OTHER PUBLICATIONS

John Hosie et al., U.S. Appl. No. 13/244,079, filed Sep. 23, 2011, Office Action Jan. 18, 2013, 12 pages.
John Hosie et al., U.S. Appl. No. 13/244,079, filed Sep. 23, 2011, Office Action Jul. 2, 2013, 14 pages.
John Hosie et al., U.S. Appl. No. 13/244,079, filed Sep. 23, 2011, Office Action Oct. 3, 2013, 14 pages.

\* cited by examiner

300 — M1 = Credit | $100 | Account#001
310 — M2 = Debit | $105 | Account#001

SCALABLE, PARALLEL PROCESSING OF MESSAGES WHILE ENFORCING CUSTOM SEQUENCING CRITERIA

BACKGROUND

The present invention relates to computing systems, and deals more particularly with message processing systems that store messages temporarily in queues, and still more particularly with concurrently processing streams of queued messages within a message queue.

Message queueing is a well-known concept in computer programming, and refers to a messaging model where messages from multiple senders are put onto a queue at a messaging service provider and then dispatched from the queue to various target recipients. The messaging service provider may also be referred to as a message queueing system. The message queue provides asynchronous communication between a message sender and recipient, whereby the sender can send the message without regard to whether the recipient is currently able to receive the message: the message remains stored in the queue until such time as it is dispatched to the recipient. The sender and recipient may be processes on a single computer, or processes on different computers. Transaction processing semantics may be used to ensure that a message is not permanently removed from the queue until the recipient has successfully received it.

BRIEF SUMMARY

The present invention is directed to concurrently processing streams of queued messages from a message queue. In one aspect, this comprises: receiving a request to assign a queued message from the message queue for processing by a thread, the queued message belonging to an identified message stream; and responsive to determining that another message belonging to the identified message stream is not currently being processed, assigning the queued message for processing by the thread. The message stream may be identified by evaluating at least one criteria that specifies how to identify the message stream. The request may comprise an identifier of the queued message and a name of the identified the message stream. Responsive to determining that another message belonging to the identified message stream is currently being processed, a different one of the queued messages may be assigned for processing by the thread, the different one belonging to a different message stream.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIGS. 5-7 provide flowcharts depicting logic which may be used when implementing an embodiment of the present invention.

DETAILED DESCRIPTION

Figure 1:
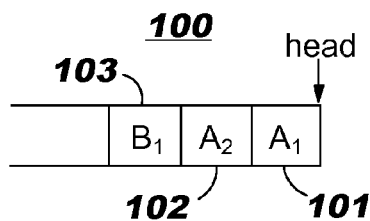
FIGS. 1 and 4 illustrate sample message queues, by way of illustrating operation of an embodiment of the present invention.

Message processing systems that store messages in queues are commonly referred to as message queueing systems. Message queueing systems typically use a first-in, first-out, or "FIFO", queueing approach for message delivery. As is well known, this comprises removing messages from the queue in the same order in which they were originally placed on the queue. However, it is recognized that a subset of the messages within a queue are often related to one another. The messages in a subset may originate from the same sender, for example, and/or they may be targeted to the same receiver. Or, multiple messages on the queue might be part of a larger transaction, such as messages that represent debits and credits of a banking transaction. Accordingly, an embodiment of the present invention treats the queue as a collection of streams, where a stream is some (possibly unbounded) subset of the messages that are related by virtue of matching certain criteria. An embodiment of the present invention enables multiple ones of the streams to be processed concurrently, while ensuring that messages within each stream continue to be processed in a FIFO order.

According to an embodiment of the present invention, streams are orthogonal—that is, each message belongs to one and only one stream. The criteria used to identify a stream are not required to be known to the queueing system. Instead, each queued message is evaluated against the criteria by a thread that reads the queued message. A browse-type reading operation is used, whereby the message is not actually removed from the queue by the read. If the browse reveals that this message belongs to a desired stream, then a subsequent operation may be used to remove the message from the queue, as will be discussed in more detail below.

An embodiment of the present invention relies on several attributes of a message queueing system and interface used to access messages in that system, including:

The message queue exists in a multi-threaded computing environment, where multiple threads process messages retrieved from the queue. An embodiment of the present invention does not place an upper limit on the number, N, of threads in this multi-threaded environment.

Messages are retrieved from the queue using transactional semantics. That is, once a message has been retrieved from the queue, it is not available to any other thread or process unless it is rolled back (and thus restored to the queue).

Messages can be retrieved in a strict FIFO fashion.

Messages can be browsed instead of retrieved. When a message is browsed, contents of the message can be inspected without removing the message from the queue, and thus there are no transactional semantics to consider when performing a browse.

Messages can be browsed sequentially. A message cursor or message sequence number may be used to keep track of a position within a queue, such that a next-sequential queued message can be readily determined.

Messages each have a unique key or identifier (hereinafter referred to as a message identifier or message ID), and thus an individual queued message can be distinguished from other messages in the queue.

Messages can be retrieved out of order following a browse, using the unique message identifier found during the browse to request the message retrieval.

An embodiment of the present invention adheres to a set of principles which include:

Messages from different streams may be processed concurrently.

Message sequencing within a particular stream is maintained. Accordingly, when one message from a stream is removed from the queue, the message is processed to completion before beginning the processing of another message in that stream.

The invoker of a message dispatching component determines which stream a queued message belongs to. This preferably comprises inspecting contents of a browsed message and comparing the contents to one or more criteria. The criteria, or some subset thereof, may be specified using an XPath expression or similar notation. (The XPath notation is well known to those of ordinary skill in the art, and is therefore not described in further detail herein.)

Messages are preferably processed using transactional semantics. That is, once a message has been removed from the queue, it is processed to completion and committed, or else the message is rolled back (which includes restoring the message to the queue).

Once a particular message has been browsed on the queue and evaluated against criteria to determine the stream to which the message belongs, the message is preferably processed to completion on that same thread. However, processing of a particular message may be switched from the thread that originally browses and evaluates the message to another thread that will complete the message processing if the alternative is to block all free threads in a wait state, even though this switching may incur a relatively significant overhead (including reparsing of the message by the taking-over thread to locate the various fields of the message).

When selecting a message to assign to a thread, message prioritization among the queued messages preferably comprises first giving priority to a stream which is not currently being processed by any thread, and then prioritizing by order within the queue. In other words, if there are queued messages for two (or more) different streams, neither of which has a message currently being processed, then the one of these streams having a message closest to the head of the queue is given higher priority and the first-queued message for this stream will therefore be retrieved and assigned to the thread.

Dispatching of messages is controlled such that a stream containing a large number of messages does not completely starve the processing of other streams. That is, in a system with N threads available for processing messages from the queue, an embodiment of the present invention ensures that the number of threads that are allowed to service messages from the same stream (including threads that are waiting on particular queued messages to become available) will be no more than (N−X) when X<N, and no more than 1 when X>=N, where X is the number of streams with messages on the queue at a point in time (including messages which have been tentatively removed but not yet committed).

An embodiment of the present invention provides a dispatcher object or component (hereinafter referred to as a dispatcher object or simply a dispatcher) that controls which messages are processed by each thread and when the processing can begin. This dispatcher is invoked by each of a plurality of threads in a multi-threaded computing environment. Using techniques disclosed herein, concurrency across streams is achieved while still ensuring that ordering within a stream is preserved. (It should be noted that while the discussion herein presumes that transactional semantics are used in the message streams, an embodiment of the present invention may alternatively be used with messages streams that do not require commit and rollback processing. It will be obvious, in view of the teachings provided herein, how this alternative can be accommodated. As an example, the above-discussed value "X" would become the number of streams with messages on the queue at a point in time or the number of streams with messages currently being processed.)

Consider, by way of illustration, the queue 100 shown in FIG. 1. Queue 100 contains 3 messages 101, 102, 103, and message 101 is at the head of the queue—that is, message 101 is the first of the messages to be enqueued. Messages 101 and 102 are both part of the same stream, referred to as stream "A" by way of illustration, and are thus denoted as messages "A1" and "A2" in the sample queue 100. Message 103, on the other hand, is for a different stream, referred to as stream "B", and thus this message is denoted as message "B1" in sample queue 100. Suppose that two threads T1, T2 are available for processing messages from queue 100. Accordingly, message A1 101 and message B1 103 may be processed concurrently by these two threads when using an embodiment of the present invention, but messages A1 101 and A2 102 are prevented from being processed concurrently. This is in contrast to known techniques where threads are assigned to queued messages in strict FIFO order, where (when using the known techniques) message A1 101 would be assigned to thread T1 and message A2 102 could be assigned to thread T2 at the same time that T1 is processing message A1.

Suppose, still referring to FIG. 1, that messages A1 101 and A2 102 form part of a banking transaction, where message A1 represents a deposit of $100 to an account holder's checking account and message A2 represents a check drawn on that account for $105. Processing message A2 prior to the completion of processing message A1 could, in some cases, lead to an overdraft of the checking account. On the other hand, if message A1 is guaranteed to be processed before message A2, then this overdraft does not occur (when considering only these two messages). An embodiment of the present invention ensures that the messages are processed in a particular order, once they have been determined to be part of the same stream. Accordingly, various dependencies among the messages—such as in the banking example—are respected.

Notably, an embodiment of the present invention does not strictly require that all messages of a particular stream are processed by one and only one thread. If thread T1 has already completed the processing of message A1 at the time when thread T2 requests a message from the queue, for example, an embodiment of the present invention allows message A2 to be assigned to thread T2.

By completing the processing of a particular message using a single thread, even though the thread may be swapped out (i.e., become temporarily inactive) during a context switch, processing efficiencies are realized. The thread must perform some amount of parsing of a message, for example, before the message can be processed. This is true even for a browsed message, where the thread invoking the browse operation parses the browsed message to determine the stream to which that message belongs—noting also that in some cases, multiple fields must be located and evaluated during the browse in order to determine the stream. It may also happen that a queued message is encrypted, in which case the browse operation includes decryption of at least part of the message. Accordingly, it is advantageous to use the information learned by the first thread during the parsing (as well as further information learned or created as the processing of the message continues), rather than allowing the message to be switched to a different thread and requiring that thread to repeat operations which were performed by the original thread.

Still referring to the sample queue 100 in FIG. 1, an embodiment of the present invention prevents stream B from being starved, as would result if known techniques were used and allocated all N (where N=2, in this case) threads to messages of stream A according to the FIFO ordering of the messages 101, 102, 103 in the queue 100.

In an embodiment of the present invention, three different invocations are supported on the queue. Two of those invocations read messages from the queue, referred to herein as (1) a "browse" invocation and (2) a "get" invocation. The third invocation on the queue, referred to herein as (3) "commit", signals the dispatcher to commit the removal of a message from the queue. An embodiment of the present invention also supports three different types of requests that can be invoked on the dispatcher, referred to herein as (1) "check", (2) "dispatch", and (3) "complete". The dispatcher may return an answer which is referred to herein as (1) "go", (2) "swap", or (3) "skip", depending on the invoked request and the current context. Each of these invocations and answers will be described in further detail herein.

Figure 2:
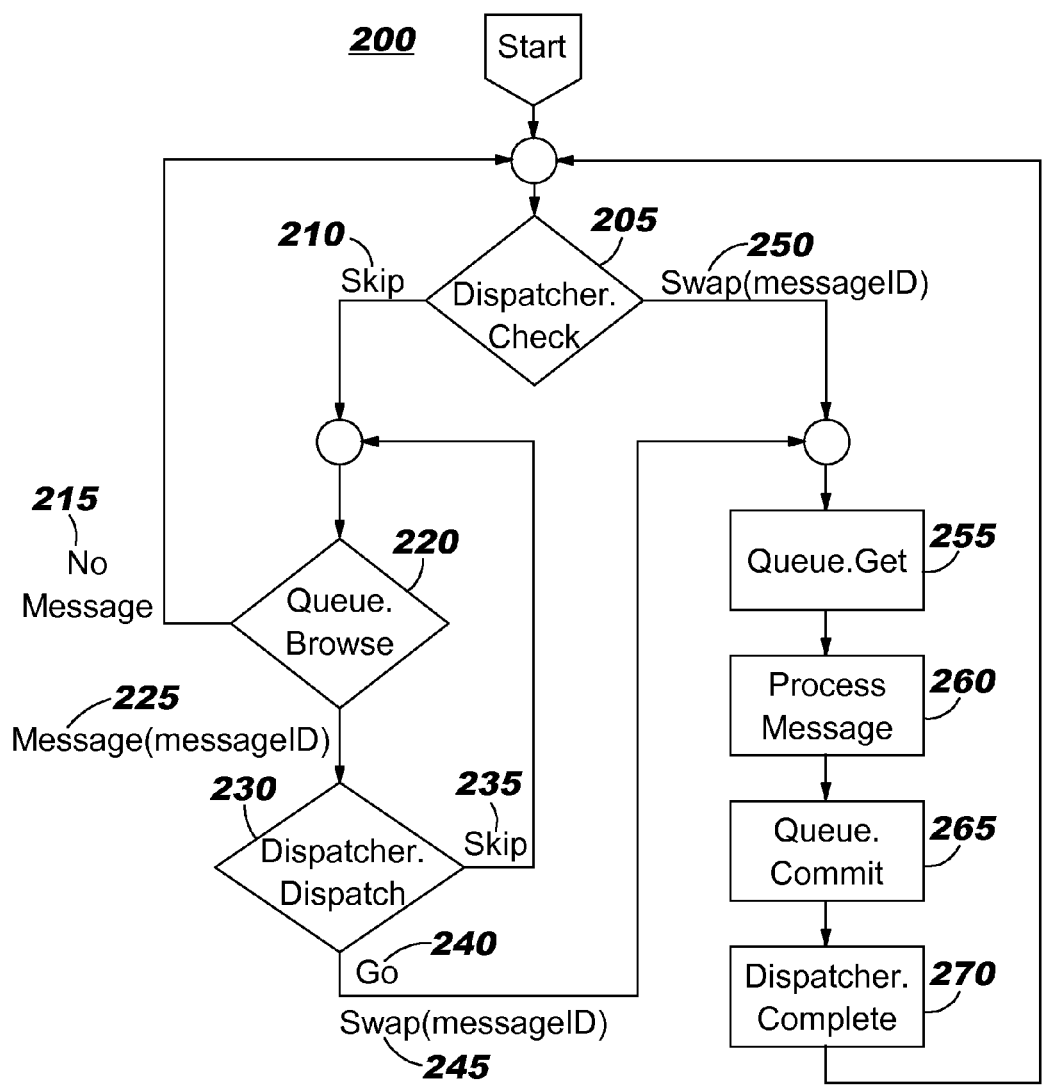
FIG. 2 provides a flowchart depicting representative interactions between an invoking thread, a queue interface, and a dispatcher interface.

Referring now to FIG. 2, a flowchart is provided showing an overall flow 200 of representative interactions between an invoking thread and the queue and dispatcher interfaces, according to an embodiment of the present invention. An invoking thread calls Dispatcher.Check (see 205), with no input parameters, to see if there are any messages which were previously blocked and remembered by the dispatcher which have now become available for processing, or whether the invoker should alternatively skip on to the next message on the queue. If the dispatcher is not aware of any such previously-blocked but now-available messages, it returns "skip" 210. This signals the invoker to call Queue.Browse (see 220) on the queue to see if there are any queued messages which have not been read yet. If there are no queued messages on the queue (see 215), then there is no work for this thread at the present time, and the thread will call Dispatcher.Check at a subsequent time by returning to 205. (Note that the dispatcher may wait before it returns an answer at various points, although waiting has not been depicted in FIG. 2.)

On the other hand, when the Queue.Browse 220 locates a message on the queue (i.e., a queue message which has not been read yet), then the message ID of that message is returned to the invoker (see 225). The invoker then preferably calls Dispatcher.Dispatch (see 230) to ask the dispatcher if that message can be processed. The result of this will be "go", "swap", or "skip".

"Skip" is returned (see 235) from the call at 230 when the dispatcher is signalling the invoker to forget about the requested message for the time being, and to go retrieve a different message from the queue after which the dispatcher is to be invoked again. (For example, thread T2 will receive a "skip" if it requests to process message A2 102 in the sample queue of FIG. 1 at a time when thread T1 is processing message A1 101.) Accordingly, the invoker returns from 230 back to 220 to browse the next message from the queue.

"Swap" is returned (see 245) from the call at 230 when the dispatcher decides that the invoker should process a different message than the message 225 which was requested by the invoker at 230. Accordingly, a (different) message ID is provided to the invoker with the "swap" answer 245.

"Go" is returned (see 240) from the call at 230 when the dispatcher is signalling the invoker to proceed with processing, to completion, the message 225 which was requested by the invoker at 230. (Note that this is the same message which was just browsed 220 by the invoker.) The dispatcher will only give this "go" answer, according to an embodiment of the present invention, if there are no other threads currently processing a message on the same stream.

For both the "go" 240 and "swap" 245 cases, the invoker uses the message ID (for the previously-browsed message or the swapped message, respectively) in a call to Queue.Get (see 255) which requests reading and removing the identified message from the queue.

Returning to the discussion of Dispatcher.Check 205, if the dispatcher is aware of a previously-blocked message that has now become available for processing, it returns a "swap" 250 along with an ID of that message. This signals the invoker that it should process this now-available message. (For example, thread T1 will receive a "swap" after it has finished processing message A1 101 in the example scenario show in FIG. 1, where the swap informs it to process message A2 102 which was originally requested—but declined—for assigning to thread T2.) The invoker then uses this ID in a call to Queue.Get (see 255) which requests reading and removing the identified message from the queue.

After the invoker has issued a Queue.Get 255 call, the invoker commences processing the message, and processes the message to completion (see 260). When processing is complete, the invoker calls Queue.Commit (see 265) to perform a commit on the queue, and calls Dispatcher.Complete (see 270) to signal the dispatcher that the processing of this message is now complete. Following the processing of 270, the thread can now request new work from the dispatcher, and control therefore returns to 205 where the invoker will issue another Dispatcher. Check.

Various elements shown in FIG. 2 will now be discussed in more detail.

Note that the dispatcher is called by an invoker to determine whether to browse the next message from the queue (i.e., via the Dispatcher.Check invocation 205), and the dispatcher is also invoked after the browsing (i.e., via the Dispatcher.Dispatch invocation 230) to determine whether the browsed message should be processed (i.e., the "go" answer 240), skipped until later (i.e., the "skip" answer 235), or replaced by processing a different message (i.e., the "swap" answer 245).

When the Dispatcher.Check call 205 is invoked, no input parameters are required from the invoker. The answer from this no-input call is either skip 210 or swap 250, where answer 250 also provides a message ID as an output parameter, as noted above.

When the Dispatcher.Dispatch call 230 is invoked, several input parameters are preferably provided to the dispatcher. These input parameters may comprise values obtained as a result of the browse invocation at 220. In one embodiment, parameters provided by an invoker on Dispatcher.Dispatch 230 comprise:

the unique identifier, i.e., message ID, of the requested message;

the name of the stream to which the requested message belongs;

context that may be stored by the dispatcher regarding the requested message—for example, the value of a browse cursor or sequence number, which reflects where this invoker is now browsing the queue; and context that may be stored by the dispatcher in association with the message, and which may be returned with this message if it is "swapped" (e.g., at 245) to enable that information to be reused.

Figures 3, 4:
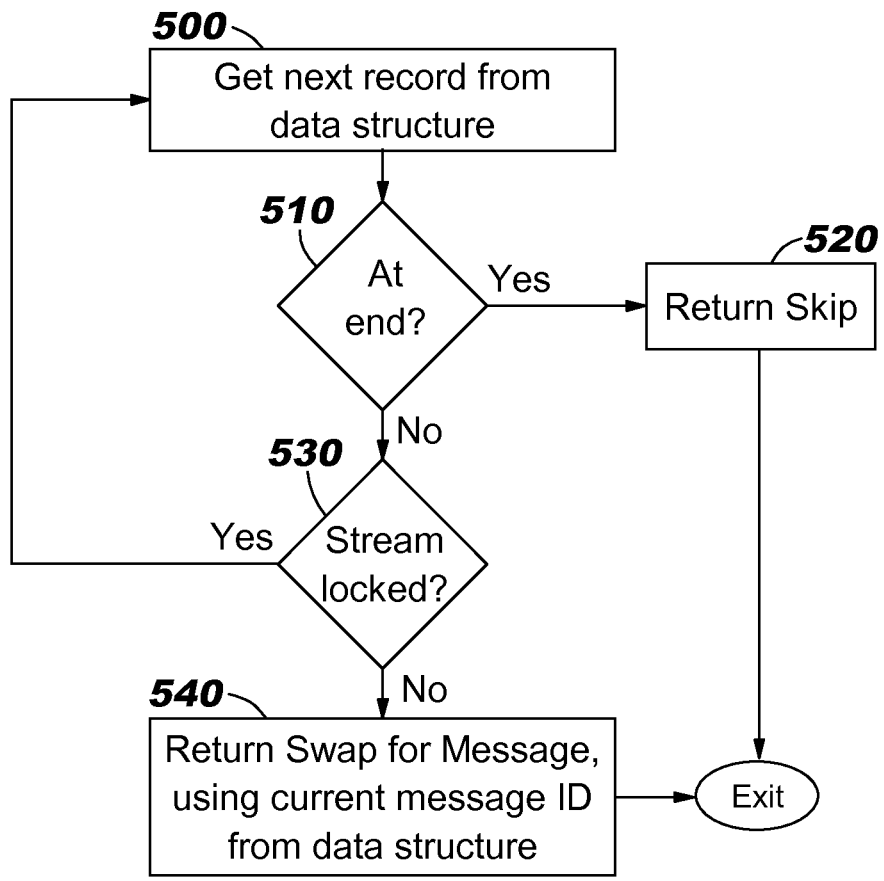
FIG. 3 depicts a simple example of messages that may be stored on a queue.

Suppose, for example, that the invoker of Dispatcher.Dispatch 230 has already decrypted the identified message passed as input when performing the browse operation at 220, and has determined that the decrypted information represents message M1 300 of FIG. 3. Messages M1 300 and M2 310 represent two messages of a banking transaction, in this example. During the browse operation, the invoker may have looked for special delimiters (shown in FIG. 3 as "|") in the message which indicate the boundaries between various fields, and may have inspected values of one or more fields. Suppose that the criteria for determining which messages form a stream for banking messages comprises having an identical account number in the third field of the message, for purposes of illustration, and thus it can be seen that messages M1 300 and M2 310 are two messages of a single stream. If the thread observes the transaction type in the first field and the transaction amount in the second field, it would be worth remembering that information because it will most likely be needed at a future point when the message is processed. Thus, in addition to passing "M1" as the unique message ID and "Account#001" as the stream name, an embodiment of the present invention may also provide "Credit" and "$100" as context information for storing by the dispatcher in association with message M1. Note that the dispatcher itself does not make use of this context information, except to return it to an invoker when the message M1 is assigned to a thread for processing. In this manner, redundant use of processing resources may be avoided. (An alternative embodiment which does not communicate this type of context information through the dispatcher, and which may therefore result in some amount of redundant processing of the message, is deemed to also be within the scope of the present invention, however.)

The flow 200 of interactions shown in FIG. 2 will now be discussed with reference to the sample queue 100 in FIG. 1. It is assumed in this discussion that two threads are available for processing the queued messages 101, 102, 103, and these threads are referred to as T1 and T2.

First, T1 checks with the dispatcher at 205, with no input parameters, to see if there are any previously-blocked but now-available messages that should be swapped in to the processing. Because the queue 100 is new, in the example, there are no such messages. Accordingly, the dispatcher returns a skip answer 210. Thread T1 therefore issues a browse request 220, providing as an input parameter a browse cursor or other pointer to this thread's current location for browsing the queue (which has preferably been initialized to point to the head of the queue), and receives a unique identifier 225, which is "A1" in the example, of first-queued message 101. (It will be obvious to one of ordinary skill in the art that the sample message identifiers "A1", "B1", "M1", etc., as used herein are selected for ease of reference, and that actual unique message identifiers would be used instead in an actual embodiment of the present invention.) Thread T1 then parses the identified message A1 (which is still on the queue) to determine the stream name (i.e., the name of the stream to which this message belongs). As noted earlier, the stream name for message A1 is "A" in this example. T1 then issues a dispatch request 230, passing as input the stream name A and the unique identifier of message A1, along with context information as discussed above. Because there are no other threads currently processing messages for stream A, in the example, the dispatcher returns a "go" 240 for the requested message (i.e., for just-browsed message A1). Thread T1 therefore issues a get request 255 to get message A1 from the queue, and T1 then begins to process 260 the message.

Meanwhile, thread T2 is ready to do work. T2 therefore checks with the dispatcher at 205, with no input parameters, to see if there are any previously-blocked but now-available messages that should be swapped in to the processing. Because no such messages have been encountered thus far, the dispatcher returns a skip answer 210. Thread T2 therefore issues a browse request 220, providing as an input parameter a browse cursor or other pointer to this thread's current location for browsing the queue, and receives a unique identifier 225, which in this case is "A2" 102. Thread T2 then parses the identified message A2 (which is still on the queue) to determine the stream name, which is "A". T2 then issues a dispatch request 230, passing as input the stream name A and the unique identifier of message A2, along with context information as discussed above. The dispatcher now detects that T2 is requesting to process a message on stream A while thread T1 is concurrently processing a message on that same stream. An embodiment of the present invention is directed toward preventing this situation (because, for example, the messages within the stream may have dependencies on one another, as has been illustrated with reference to the banking messages shown in FIG. 3). Accordingly, the dispatch request 230 returns skip 235 to inform T2 to skip the requested message (i.e., the message which it has just browsed), and the dispatcher will hold or block message A2 for processing until such time as thread T1 finishes processing the other message on stream A. Responsive to receiving skip 235, thread T2 invokes another browse operation 220 to browse the next-queued message. This invocation returns a unique identifier 225, which in the example is "B1", of the next-queued message 103. T2 parses the identified message (which is still on the queue) to determine the stream name. For message B1 103, the stream name is "B" in the example. Thread T2 then issues a dispatch request 230, passing as input the stream name B and unique identifier B1, along with context information as discussed above. Because there are no other threads currently processing messages for stream B, in the example, the dispatcher returns a "go" 240 for the requested message (i.e., for just-browsed message B1). Thread T2 therefore issues a get request 255 to get message B1 from the queue, and T2 then begins to process 260 the message.

When T1 completes the processing of message A1 101, it invokes a commit 265 on the queue and a complete 270 on the dispatcher, which results in committing the removal of message A1 from the queue. The new head of queue 100 will now be message A2 102. T1 then issues a new check 205, with no input parameters, to see if there are any previously-blocked but now-available messages that should be swapped in to the processing. In the example, there is one such message, namely message A2 which was blocked responsive to the processing request by T2. Accordingly, the response from the check request 205 is a swap answer 250, along with the unique identifier of the now-available message A2. Thread T1 therefore issues a get request 255, using the message ID A2 as input, to request reading message 102 and removing it from the queue. Thread T1 then begins processing 260 message A2.

Note that by allowing the dispatcher to be invoked at 205 prior to browsing the queue at 220, the dispatcher can ensure that any messages already browsed are prioritized higher than messages which have not yet been browsed.

Consider, as another simple yet illustrative example, the sample queue 400 shown in FIG. 4. This sample queue originally contains four queued messages A1, A2, B1, C1. Suppose that two threads T1, T2 are again used to process the queue, and that thread T1 completes its processing of message A1 while T2 is still processing B1 (as has been discussed above with reference to sample queue 100 of FIG. 1). Now, messages A1, A2, and B1 have all been browsed (and message A1 has been removed), so the next message to be browsed in this example is C1. However, although message A2 has been browsed, it has not been processed yet, and because the processing of message A1 (i.e., the other message that, together with message A2, forms stream A) is now complete, there is no reason in this example why message A2 cannot now be processed. Accordingly, instead of browsing message C1 by thread T1 at 220, the check 205 will swap message A2 to thread T1 for processing, as shown at 250.

For the processing of queue 100 and also of queue 400, when message A2 is browsed, the dispatcher needs to make a decision as to whether to make T2 wait for T1 to complete its processing of message A1 (to be followed by assigning message A2 to thread T2), or instead to swap message A2 out and have thread T2 skip to the next message on the queue. When only two threads are used, the answer is straightforward: T2 should not be blocked, with no useful work, and thus the dispatcher answers with a skip at 235. This approach of skipping to the next queued message is also followed, according to an embodiment of the present invention, when there are N threads (N>2) and all free ones of those threads would wait in the absence of the skip.

Also note that in the examples using queues 100 and 400, when there are more than two threads, of which at least two are free, and thread T2 has requested message A2 only to find that this message is blocked because of the concurrent processing of message A1, an embodiment of the present invention may direct T2 to wait rather than to skip at 235. The only options that can be provided to T2 at this point are skip or wait (i.e., because in the example, there are no previously-blocked but now-available messages that can be swapped to T2). Use of skip, as disclosed herein, allows the thread to look on the queue in case the next message is for a different stream and is therefore eligible for processing. However, when the dispatcher knows that there are multiple free threads available, there is no benefit to be gained by asking T2 to skip. That is, the next-queued message B1 can be processed by another free thread T3 which is not already storing context information about a blocked message. Accordingly, T2 can be asked to wait until the processing of message A1 is complete, at which time T2 can then process A2. This waiting approach improves efficiency because T2 has expended resources while browsing message A2, and can reuse that information, as opposed to assigning T2 to another message and requiring a different thread Tx to repeat the processing of message A2 because T2 is busy on the other message.

Suppose, as a further example, that there are N threads available and that the messages on the queue are in the following order:

A1, A2, . . . A(n−1), An, B1, C1

In other words, there are N queued messages for stream A, and additional queued messages for other streams. An embodiment of the present invention ensures that not all N threads will be assigned to stream A to the exclusion of other streams B and C. This preferably comprises having the dispatcher start off by blocking threads so that messages may be read, parsed, and eventually processed on the same thread that does the initial read, while still ensuring that one of the following is true:

there is always at least one thread free to skip on to the next queued message;

all threads are currently processing a message; or there are no more messages on the queue.

The dispatcher of preferred embodiments will now be discussed in more detail. Mechanisms implemented by the dispatcher preferably include (1) dynamically allocating a lock for each stream to ensure that only one thread at a time processes messages of a given stream; (2) implementing an algorithm to decide whether to answer go, skip, or swap; and (3) maintaining an in-memory data structure to record identifiers, stream names, and context information for those messages which have been swapped out (that is, held for subsequent assignment to a thread and thus assigned out of turn, as has been discussed above with reference to 245 and 250 of FIG. 2).

With reference to the locks, the dispatcher preferably creates a lock for a particular stream when a message for that stream is dispatched. This dispatching may be a result of go message 240, swap message 245, or swap message 250. The lock is preferably tested at 230 to determine whether a requested message can be assigned to the invoker, and is preferably released at 270 during the completion processing for a message.

With reference to the in-memory data structure, the information passed as input to the dispatcher at 230 for a particular message is preferably recorded therein to enable reuse in the case that the invoker which passes the information as input is notified to swap to process a different message, in which case the particular message becomes a blocked message. The recorded information can then be provided as output when the particular blocked message is eventually assigned to a thread (e.g., by a swap at 245 or 250), in an attempt to improve processing efficiency for that thread. The data structure preferably uses the stream name as a key. Entries in this data structure may be processed in a FIFO manner when selecting which swapped-out message to assign to a thread. If multiple records exist for a particular stream name, then the least-recently-added (i.e., oldest) stored record for that stream name is preferably selected for assigning to a thread.

Figure 6:
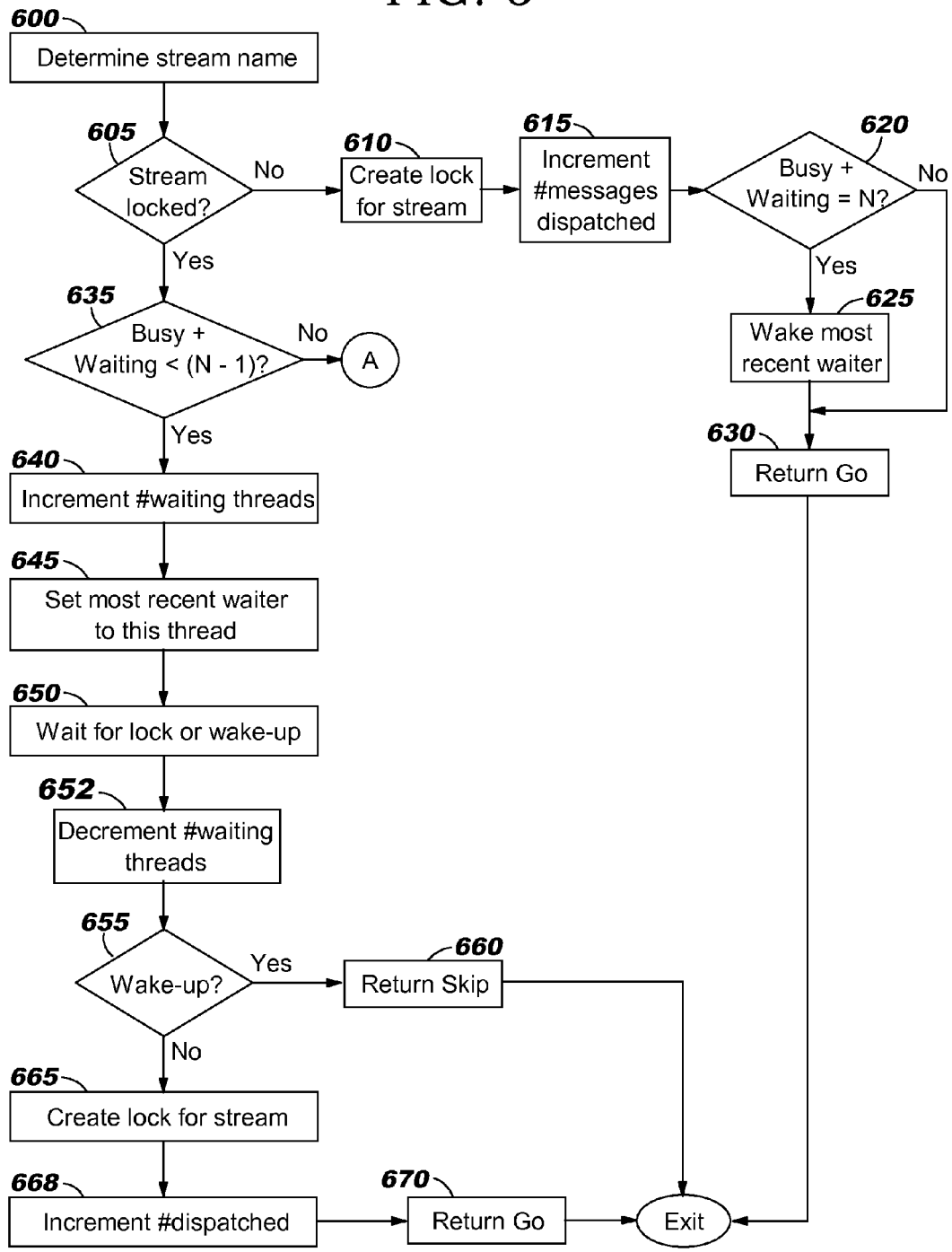
Figure 6:
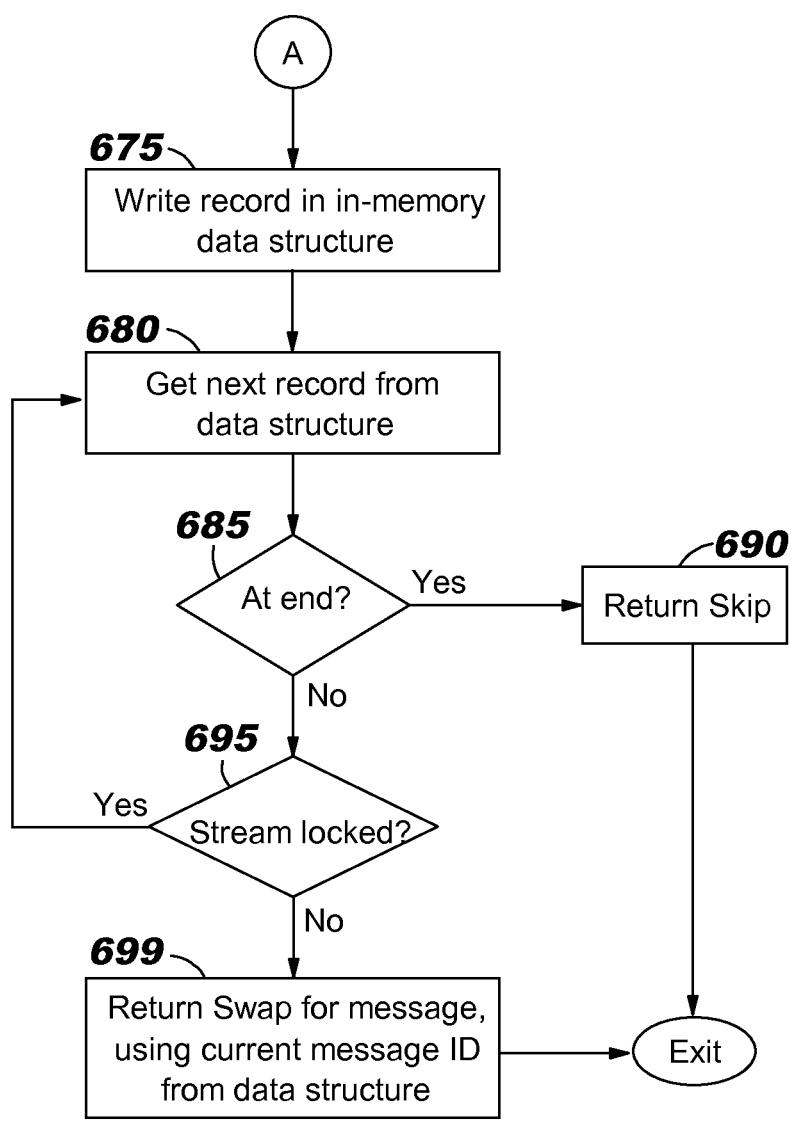
Figure 7:
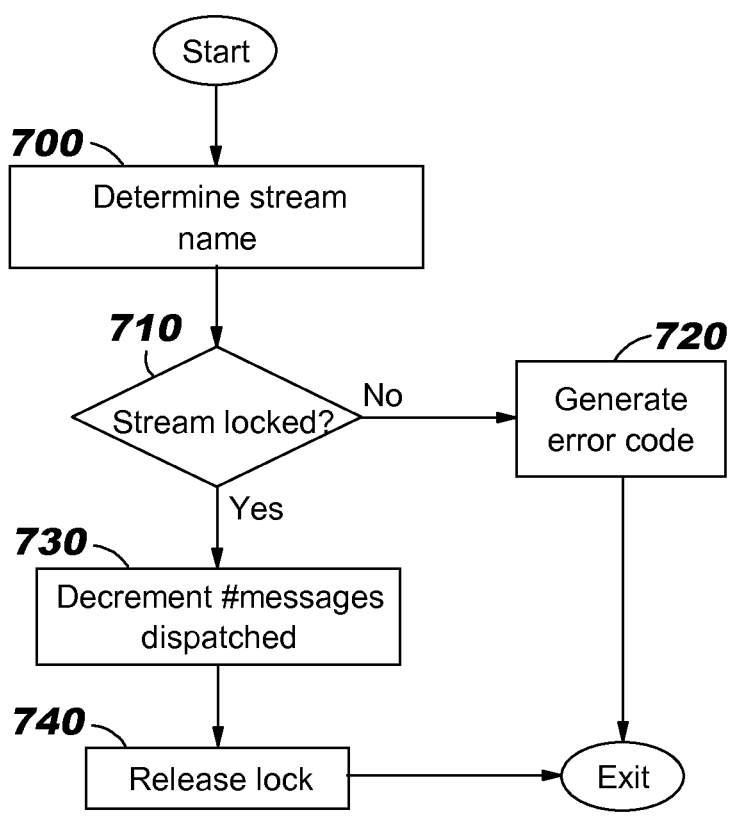

Turning now to FIGS. 5-7, flowcharts are provided that depict logic which may be used when implementing an embodiment of the present invention. These flowcharts represent processing of Dispatcher.Check invocation 205, Dispatcher.Dispatch invocation 230, and Dispatcher.Complete invocation 270, respectively. As noted earlier, Dispatcher.Check has no input parameters; Dispatcher.Dispatch is invoked with a message ID (in addition to other information, discussed earlier); and Dispatcher.Complete is invoked to notify the dispatcher that a message has been processed to completion. As has also been discussed earlier, the response from the dispatcher for these invocations comprises either skip (see 210) or swap (see 250) for Dispatcher.Check, and either skip (see 235), go (see 240), or swap (see 245) for Dispatcher.Dispatch. The Dispatcher.Complete invocation does not return an output event of this type. When swap is returned from the dispatcher, it includes a message ID of the swapped-in message, and preferably also includes context information associated with that message.

The processing of Dispatcher.Check 205, as illustrated in FIG. 5, comprises determining whether there are any previously-blocked but now-available messages that should be swapped in. This processing begins by getting the next record from the above-described in-memory data structure (Block 500). Block 510 tests whether the data structure is already at the end. If so (i.e., the test at Block 510 has a positive result), then no record was located using this in-memory data structure, so processing continues at Block 520 where the "skip" answer shown at 210 in FIG. 2 is returned. The processing of FIG. 5 then exits.

When the test at Block 510 has a negative result, then there are still more records to evaluate in the in-memory data structure. Accordingly, processing continues at Block 530, which uses the stream name from the current record to determine whether a lock is currently active for that stream. If so (i.e., the test at Block 530 has a positive result), then a message in this stream is already being processed, and the blocked message represented by this row of the in-memory data structure must therefore remain blocked at the present time. Processing therefore returns to Block 500 to get the next record (if any) from the in-memory data structure.

When the test at Block 530 has a negative result, then the current record from the in-memory data structure is for a stream that is not currently being processed. Accordingly, the message that corresponds to this row will be swapped in—that is, it will be assigned for processing by the current invoker of Dispatcher.Check 205. Processing therefore reaches Block 540, which extracts the message ID from the current row of the in-memory data structure, along with any context information stored in that row, and provides this information as output to the invoking thread. This corresponds to the "swap" answer shown at 250 in FIG. 2. The processing of FIG. 5 then exits.

The processing of Dispatcher.Dispatch 230, as illustrated in FIG. 6, corresponds to the dispatcher determining whether a requested message should be processed by the invoker, and if not, what to do instead. This processing begins at Block 600 by determining the stream name for the message that is passed as input by the invoker. Block 605 tests whether a lock is currently active for that stream. If not (i.e., the test at Block 605 has a negative result), then a message is not currently being processed for this stream, and the requested message will therefore be given a "go" answer. Processing therefore continues at Block 610. Otherwise, when the test at Block 605 has a positive result (i.e., there is a lock on the stream of the requested message), then processing continues at Block 635, which begins a process of determining what to do instead of allowing the invoker to process the requested message.

At Block 610, a lock is created for the stream of the requested message. Blocks 615-625 then perform processing directed to ensuring that there is always at least one thread available (i.e., not processing a message and not waiting) to check for more eligible messages from the queueing system. Block 615 increments a counter that counts the number of messages dispatched—that is, the number of messages which are currently being processed. Block 620 then tests whether the number of busy threads (i.e., the number of threads to which an active message is dispatched, as represented by the counter incremented at Block 615) plus the number of currently-waiting (i.e., blocked) threads is equal to N, where N represents the total number of active threads in the system. When this test has a positive result, there are no idle threads. Accordingly, control transfers to Block 625, which wakes the most-recent waiter thread. (Alternatively, the thread to be awakened may be selected in another way without deviating from the scope of the present invention.) In any case, Block 630 returns a "go" to the invoker, after which the processing of this invocation of FIG. 6 exits. This "go" answer corresponds to 240 of FIG. 2.

When control reaches Block 635, indicating that the stream of the requested message is locked, a test is performed to determine whether the number of busy threads plus the number of currently-waiting (i.e., blocked) threads is less than (N−1), which represents one less than the total number of active threads in the system. When this test has a positive result, there is at least one idle thread in the system. Accordingly, processing continues at Block 640. Otherwise, when there are no idle threads, as determined by a negative result at Block 635, then control transfers to Block 675.

Block 640 is reached when the invoker will be asked to wait before processing the requested message. Accordingly, Block 640 increments the number of threads waiting, and Block 645 sets a variable or flag to signify that this invoker is the most recent waiter. At Block 650, a wait is performed that waits for a signal that the currently-held lock on this stream is released (e.g., by the processing of Block 740 of FIG. 7) or that this thread is awakened by another thread (e.g., by the processing of Block 625 of FIG. 6). In either case, when the wait is ended, Block 652 decrements the number of waiting threads. Block 655 then tests why the wait ended. If the wait ended because thread is awoken, then the test at Block 655 has a positive result, and "skip" is returned to the invoker at Block 660. This "skip" answer corresponds to 235 of FIG. 2. The processing of FIG. 6 then exits.

Suppose that the queued messages comprise, in FIFO order, A1, A2, . . . A(n−1), An, B1, C1 and that there are a total of N available threads. For each thread T(x) that requests a message from stream A, where x=2 through (N−1), the dispatcher will preferably block the thread at Block 640, using a wait on all previous threads. When thread T(N) invokes the dispatcher with message A(N), the dispatcher does not block this thread, however. Instead, the dispatcher will swap message A(N) out and return a "skip" to the invoking thread. This "skip" corresponds to 235 of FIG. 2. Thread T(N) will therefore browse the queue at 220, at which time it will locate message B1. Thread T(N) will then invoke Dispatcher.Dispatch with this message B1 as input, and the dispatcher will assign thread T(N) to process message B1 to completion—that is, a "go" 240 will be returned to thread T(N). At this point, thread T(N−1) will awake from its wait (causing the test at Block 655 to have a positive result) because all other threads are either dispatched or blocked. Message A(N−1), which was the input from thread T(N−1), will be swapped out, and this thread T(N−1) will then be instructed to "skip" to the next message at Block 660.

When the test at Block 655 has a negative result because the lock on the requested stream (i.e., the stream name passed as input to Dispatcher.Dispatch at 230) has been released, then processing reaches Block 665, which creates a lock for that stream in order for the current invoker to process the currently-requested message. Block 668 increments the counter that counts the number of messages dispatched. Block 670 then returns a "go" answer to the invoking thread, which corresponds to "go" 240 of FIG. 2, and the processing of FIG. 6 then exits.

Block 675 is reached when it does not appear to be desirable to have the invoker wait, and the requested message cannot currently be processed because another message on the same stream is already being processed. Accordingly, Block 675 writes a record to the above-discussed in-memory data structure, where this record contains information passed as input by the invoker. This information preferably comprises the unique ID of the requested message, the stream name for that message, and context information as discussed earlier.

Block 680 gets the next record from this in-memory data structure, and Block 685 tests whether the data structure was already at the end (i.e., all the records were already read). If this test has a positive result, then there is no alternative message available for swapping in to this invoker, and Block 690 therefore returns a "skip" answer, after which the processing of FIG. 6 exits. This "skip" answer corresponds to 235 of FIG. 2.

When the test at Block 685 has a negative result, indicating that there are still more records in the in-memory data structure that can be evaluated, processing reaches Block 695. Block 695 comprises determining the stream name from the current data structure record, and determining whether a lock is currently active for that stream. If so, then the corresponding blocked message must remain blocked for now, and processing therefore returns to Block 680 to obtain the next record (if any) from the in-memory data structure. When Block 695 has a negative result, this indicates that the stream that corresponds to the current record from the in-memory data structure is not locked. That is, a previously-blocked message has been found that is now able to be processed because (in addition to meeting the requirements of Block 635) no other message on that stream is currently being processed. Processing therefore reaches Block 699, which extracts the message ID from the current row of the in-memory data structure, along with any context information stored in that row, and provides this information as output to the invoking thread in a "swap" answer. This corresponds to the "swap" answer shown at 245 in FIG. 2. The processing of FIG. 6 then exits.

The processing of Dispatcher.Complete 270, as illustrated in FIG. 7, corresponds to the completion of processing of a message by a thread. This processing begins at Block 700 by determining the stream name for the message that has now completed processing. The stream name may be passed as input, or it may have been stored in shared storage that is accessible to the dispatcher, for example, or in a variable that was used by the dispatcher as the message was processed or finished its processing. Block 710 tests whether a lock is currently active for that stream. If so (i.e., the test at Block 710 has a positive result), then Block 730 decrements the counter of the number of messages which are dispatched—which is also the number of busy threads—after which Block 740 releases the lock so that a different message in this stream can then be processed. In this manner, the lock ensures that no more than one message is processed, at a time, within each stream. The processing of FIG. 7 then exits.

When the test at Block 710 has a negative result, then this is an error situation because the message for which completion of processing is signaled was supposed to have its stream locked. Block 720 therefore generates an error code. The processing of this error may comprise various things such as writing a record to an error log, sounding an alarm for an operator console, and so forth. The processing of FIG. 7 then exits.

As has been demonstrated above, an embodiment of the present invention provides techniques for scalable, parallel (i.e., concurrent) processing of messages from a message queue while enforcing sequencing within a logical grouping that is referred to herein as a stream. Dependencies among messages can therefore be respected. While discussions herein refer to message queueing systems having particular attributes, an embodiment of the present invention is not limited to use with such queueing systems. Instead, an embodiment of the present invention may be used with generally any queueing system that provides some capability for (1) reading messages in order; (2) completing the processing of those messages in any order, including taking messages out of turn; and (3) completing (and committing) the processing of a message on a different thread from which it was initially read.

Figure 8:
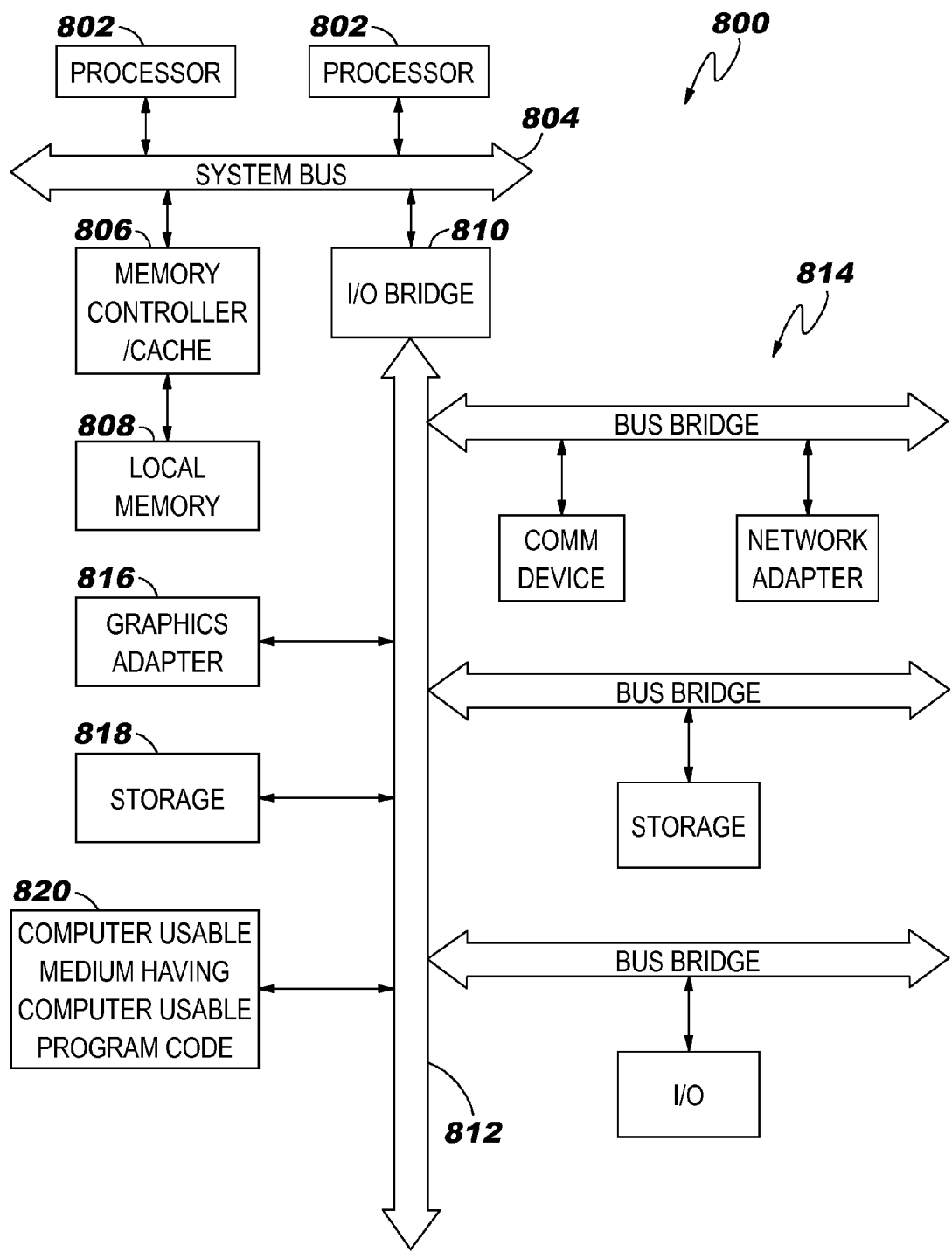
FIG. 8 depicts a data processing system suitable for storing and/or executing program code.

Referring now to FIG. 8, a block diagram of a data processing system is depicted in accordance with the present invention. Data processing system 800, such as one of the processing devices described herein, may comprise a symmetric multiprocessor ("SMP") system or other configuration including a plurality of processors 802 connected to system bus 804. Alternatively, a single processor 802 may be employed. Also connected to system bus 804 is memory controller/cache 806, which provides an interface to local memory 808. An I/O bridge 810 is connected to the system bus 804 and provides an interface to an I/O bus 812. The I/O bus may be utilized to support one or more buses 814 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 816, storage 818, and a computer usable storage medium 820 having computer usable program code embodied thereon. The computer usable program code may be executed to execute any aspect of the present invention, as have been described herein.

The data processing system depicted in FIG. 8 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including (but not limited to) an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of concurrently processing streams of queued messages from a message queue, comprising:
   receiving a request to assign a queued message from the message queue for processing by a particular thread, the queued message belonging to an identified message stream having a plurality of messages queued on the message queue;
   responsive to determining that no other message belonging to the identified message stream is currently being processed by any of a plurality of threads servicing the messages from the message queue, assigning the queued message for processing by the particular thread and otherwise, performing:
      blocking the queued message for which the request was received;
      assigning a different one of the queued messages for processing by the particular thread, the different one belonging to a message stream that is different from the identified message stream; and
      storing, in a data structure that records information pertaining to blocked messages, information pertaining to the queued message for which the request was received; and
   subsequently evaluating the stored information in the data structure to determine if the queued message for which the request was received can be unblocked and assigned to a different thread for processing by the different thread, wherein the queued message can be unblocked responsive to determining that the any other message belonging to the identified message stream is no longer currently being processed; and
   responsive to unblocking the queued message and assigning the queued message to the different thread, passing the information stored in the data structure for the queued message to the different thread.

2. The method according to claim 1, wherein the message stream is identified by evaluating at least one criteria that specifies how to identify the message stream.

3. The method according to claim 1, wherein the request comprises an identifier of the queued message and a name of the identified message stream.

4. The method according to claim 1, wherein the information in the data structure is evaluated for determining whether the queued message can be unblocked and assigned to the different thread prior to the different thread checking for a next-queued one of the queued messages, thereby giving priority to previously-blocked but now-unblocked ones of the queued messages for assigning to the different thread.

5. The method according to claim 1, wherein determining that no other message belonging to the identified message stream is currently being processed by any of the plurality of threads comprises determining that the identified message stream is not currently locked.

* * * * *